(12) United States Patent  (10) Patent No.: US 9,021,501 B2
Li et al.  (45) Date of Patent: *Apr. 28, 2015

(54) COMBINATORIAL COMPUTING

(75) Inventors: Yan Li, Beijing (CN); Haibo Lin, Beijing (CN); Liu Tao, Beijing (CN); Yudong Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 266 days.

This patent is subject to a terminal disclaimer.

(21) Appl. No.: 13/584,876

(22) Filed: Aug. 14, 2012

(65) Prior Publication Data

US 2012/0311587 A1 Dec. 6, 2012

Related U.S. Application Data

(63) Continuation of application No. 13/432,080, filed on Mar. 28, 2012.

(30) Foreign Application Priority Data

Mar. 31, 2011 (CN) .......................... 2011 1 0079617

(51) Int. Cl.
*G06F 9/46* (2006.01)
*G06F 9/50* (2006.01)

(52) U.S. Cl.
CPC .................... *G06F 9/5066* (2013.01)

(58) Field of Classification Search
None
See application file for complete search history.

(56) References Cited

U.S. PATENT DOCUMENTS

| 7,523,123 | B2 | 4/2009 | Yang |
| 2010/0122065 | A1 | 5/2010 | Dean et al. |
| 2010/0257198 | A1 | 10/2010 | Cohen et al. |
| 2010/0281078 | A1 | 11/2010 | Wang et al. |
| 2010/0306286 | A1 | 12/2010 | Chiu et al. |
| 2011/0066602 | A1 | 3/2011 | Studer et al. |

FOREIGN PATENT DOCUMENTS

| CN | 1394314 | 1/2003 |
| CN | 101441557 | 5/2009 |
| CN | 101582090 | 11/2009 |
| CN | 101847086 | 9/2010 |
| CN | 101980182 | 2/2011 |

OTHER PUBLICATIONS

Jiang et al. ("MAP-JOIN-REDUCE: Towards Scalable and Efficient Data Analysis on Large Clusters", published online Dec. 15, 2010, found on the internet: http://www.comp.nus.edu.sg/~atung/publication/map_join_reduce.pdf).*

(Continued)

*Primary Examiner* — Abdullah Al Kawsar
*Assistant Examiner* — Wissam Rashid
(74) *Attorney, Agent, or Firm* — Vazken A. Alexanian; Kevin D. Kehe

(57) ABSTRACT

A combinational computing apparatus and method. The combinational computing method includes the steps of: receiving a first setting relating to multiple groups of input data and a second setting relating to a combinatorial mode among multiple groups of input data, obtaining the data combination of the multiple groups of input data according to the first setting and the second setting, and performing a desired calculating operation on the data combination.

11 Claims, 6 Drawing Sheets

(56) References Cited

OTHER PUBLICATIONS

Ekanayake, J., et al., "Architecture and Performance of Runtime Environments for Data Intensive Scalable Computing", School of Informatics and Computing, Indiana University, Bloomington IN, USA. http://grids.ucs.indiana.edu/ptliupages/presentations/SC09-slides-jaliya-ekanayake.pdf.

Jiang, D., et al., "MAP-JOIN-REDUCE: Towards Scalable and Efficient Data Analysis on Large Clusters", IEEE Transactions on Knowledge and Data Engineering, vol. 23, No. 9. Sep. 2011. Digital Object Identifier: 10.1109/TKDE.2010.248. Copyright 2011 IEEE.

Li, Y., et al., "Combinatorial Computing", U.S. Appl. No. 13/432,080. Filed Mar. 28, 2012.

Xie, J., et al., "Improving MapReduce Performance through Data Placement in Heterogeneous Hadoop Clusters", Proceedings of the 19th International Heterogeneity in Computing Workshop, Atlanta, Georgia, Apr. 2010. pp. 1-9.

Zhang, S., et al., "SJMR:Parallelizing Spatial Join with MapReduce on Clusters", IEEE International Conference on Cluster Computing and Workshops, 2009. CLUSTER'09. Aug. 31-Sep. 4, 2009. pp. 1-8. Digital Object Identifier: 10.1109/CLUSTR.2009.5289178.

\* cited by examiner

COMBINATORIAL COMPUTING

CROSS-REFERENCE TO RELATED APPLICATION

This application is a continuation of and claims priority from U.S. application Ser. No. 13/432,080 filed on Mar. 28, 2012, which in turn claims priority under 35 U.S.C. §119 from Chinese Patent Application No. 201110079617.3 filed Mar. 31, 2011, the entire contents of both applications are incorporated herein by reference.

BACKGROUND OF THE INVENTION

1. Field of the Invention

The present invention relates to a distributed parallel computing system. More particularly the present invention relates to an apparatus and method for combinatorial computing in a parallel computing system.

2. Related Art

The development of information technology provides increasingly rich and powerful applications and services, and at the same time brings forward increasing demands on the computing capacity of the processing equipments. In spite of the ever increasing running speed of processors, facing an immense amount of information and data, the distributed parallel computing becomes a practical solution.

The distributed parallel computing is a solution where a processing task is dispersed to a plurality of processors to be concurrently executed. Nowadays, many implementing modes for massively parallel computing exist, of which the most important and frequently used is the MapReduce model.

MapReduce is a concise parallel computing model, whose name originates from the two core operations in the model: Map and Reduce. The two concepts come from functional programming languages. Briefly speaking, Map is to map a set of data to another set of data one-to-one according to a mapping rule specified by a function defined by a user. Reduce is to combine and reduce a set of data according to a function defined by a user.

During the process of the Map, data are processed in parallel separately and independently, while during the process of the Reduce, the separated data are combined together. Therefore, by using the separation and combination of the Map and Reduce operations, we can divide a complex and huge task into many jobs to be computed in parallel, and then synthesize the results of parallel computing, thus obtaining the desired results.

FIG. 1 schematically shows the basic structure of the MapReduce model in the prior art. In the Map and Reduce model shown in FIG. 1, each mapping unit reads from the corresponding data source the input data in the format of key value pairs (k, v), and maps the input key value pairs (k, v) to new key value pairs (referred to as intermediate key value pairs) according to a function defined by users. After that, in the process of Reduce, the intermediate key value pairs with the same keys are sent to the same reducing unit, where the results are synthesized.

As described above, in the existing MapReduce model, the input data must be in the format of single key value pair. That is, the mapping unit can only operate on a single key value pair (k, v), and therefore only supports the input of single data source. For many applications, however, the requirement of inputting in the format of single key value pair is too strict for the parallel computing design. In fact, in many applications, a plurality of data sources are used as input data, and it is desired to perform combinatorial computing on the plurality of data sources. In this case, the existing MapReduce model has great limitation. Next, the combinatorial computing on several sets of input data will be illustrated in conjunction with two examples.

In one example, the parallel computing system is used to configure an array antenna. Since all the information relating to the array antenna is stored in the form of matrix, the computing system needs to perform various kinds of calculations on large matrix. For a m*s Matrix A, if we multiply A by a constant $\lambda$, according to the existing MapReduce model, we can set the input key value pair (k1, v1) as k1=the row number of the matrix, v1=the matrix elements of the corresponding row, and set the mapping function as f(k1, v1)=(k1, $\lambda$v1), thereby obtaining the mapped key value pair (k2, v2)=f(k1, v1), which stands for the result of multiplication by a constant.

However, if we multiply Matrix A by another s*n Matrix B, according to the definition of matrix multiplication, it is inevitable to perform combinatorial operations on the elements of Matrices A and B simultaneously, that is, it is desired to take the elements in two matrices simultaneously as input data. In the prior MapReduce computing system, as the mapping unit can only receive single key value pair as the input, the programmers usually have to split and distribute the elements in Matrix B via complex algorithms, and design complex input key value pairs to achieve the multiplication of two matrices.

In another example, the parallel computing system is used to achieve recommending function, which is extensively applied to various online shops. In particular, after a user m purchases a commodity n, the system can record the rating Rm-n on the commodity n by the user m to analyze the similarity S between commodities.

On the basis of obtaining similarities among any commodities, when a user is purchasing a commodity I, the system can select by calculation, the commodity having the greatest similarity S with the commodity I, and recommend it to the user.

Generally, the rating data for use to calculate similarities are recorded in shared files such as HDFS (Hadoop Distributed File System) in the format of matrix, tables, etc.

For calculating similarities among commodities, in one algorithm, the similarity between Commodity I and Commodity j is defined as:

$$S(Comi, Comj) = \frac{\sum_{Userm} R_{m-i} \times R_{m-j}}{\sqrt{\sum_{Userm} R_{m-i}^2} \times \sqrt{\sum_{Userm} R_{m-j}^2}} \quad (1)$$

Obviously, the calculation of the above similarity relates to the rating on the two Commodities i and j by users. However, as described above, the prior MapReduce system can only read single key value pair as the input. Therefore, we usually take the ratings on a Commodity i by various users as the input data, that is, to set the input key value pair as (Commodity i, (User 1, $R_{1-i}$) (User 2, $R_{2-i}$) (User 3, $R_{3-i}$) ... ).

In order to calculate the similarity between Commodities i and j, in one solution, the parallel computing unit in the MapReduce system reads Commodity j-related data from the HDFS shared files, and combines the data with the received rating information on Commodity i to calculate the similarity.

However, as all the computing units need to access the HDFS system via network, such a solution can result in enormous network 10, and therefore reducing the calculating capacity. In another solution, MapReduce system first converts the received key value pair data, and by indexing based on users, configures them as (User m, (Commodity 1, $R_{m-1}$)

(Commodity 2, $R_{m-2}$) (Commodity 3, $R_{m-3}$)...), thereby obtaining Rm-i and Rm-j, and then, performs summation by traversing m according to the formula (1).

Nevertheless, the above process of conversion and calculation can result in a large number of intermediate key value pairs. These intermediate key value pairs need to be distributed among various computing units of the MapReduce system, thus resulting in the risk of IO obstructions in the system, and reducing the computing capacity and the execution efficient.

Besides the two examples mentioned above, there are still many applications depending on multiple data sources. Because of the limitations of the prior MapReduce parallel computing system, the execution of these applications can face problems similar to the above examples. Therefore, it is desired to provide a solution which can improve the prior parallel computing to further enhance the computing capacity.

SUMMARY OF THE INVENTION

One aspect of the invention includes a combinatorial computing apparatus in a parallel computing system. The combinational computing apparatus includes: an input-setting unit configured to receive a first setting relating to multiple groups of input data and a second setting relating to the combinatorial mode among the multiple groups of input data, a data-obtaining unit configured to obtain a data combination of the multiple groups of input data according to the first setting and the second setting, and at least one combinatorial operating unit configured to perform a desired calculating operation on the data combination.

Another aspect of the invention includes a parallel computing system. The parallel computing system includes: the combinatorial computing apparatus according to the immediately preceding paragraph, where the combinational computing apparatus produces intermediate data, and a reduce computing apparatus including a plurality of reducing units, each reducing unit configured to reduce and merge the intermediate data to produce a final result.

Yet another aspect of the invention includes a combinatorial computing method. The combinatorial computing method including the steps of: receiving a first setting relating to multiple groups of input data and a second setting relating to a combinatorial mode among the multiple groups of input data, obtaining a data combination of the multiple groups of input data according to the first setting and the second setting, and performing a desired calculating operation on the data combination.

DETAILED DESCRIPTION OF THE INVENTION

In view of the above questions, the present invention is proposed to improve the prior parallel computing system.

According to a first aspect, the present invention provides a combinatorial computing apparatus in a parallel computing system, including: an input-setting unit, configured to receive a first setting relating to multiple groups of input data and a second setting relating to the combinatorial mode among the multiple groups of input data; a data-obtaining unit, configured to obtain the data combination consisting of the multiple groups of input data according to the first setting and the second setting; and at least one combinatorial operating unit, configured to perform the desired calculating operation on the data combination.

According to a second aspect, the present invention provides a parallel computing system, including: a combinatorial computing apparatus according to the first aspect of the invention, which produces intermediate data; and a reduce computing apparatus, including a plurality of reducing units, each configured to reduce and merge the intermediate data to produce a final result.

According to a third aspect, the present invention provides a combinatorial computing method in a parallel computing system, including: receiving a first setting relating to multiple groups of input data and a second setting relating to the combinatorial mode among the multiple groups of input data; obtaining the data combination consisting of the multiple groups of input data according to the first setting and the second setting; and performing the desired calculating operation on the data combination.

The apparatus, system and method for the invention can help improve the prior parallel computing mode, make the design and operation of parallel computing easier, and enhance the performance and efficiency of the parallel computing system.

Next, the embodiments of the invention will be described in conjunction with the drawings. It should be appreciated that the description of the following detailed embodiments are merely to explain the exemplary implementing modes, rather than to impose any limitation on scope of the invention.

In many embodiments of the invention, in a distributed parallel computing system, a combinatorial computing apparatus is provided to replace the mapping unit of the prior MapReduce model.

To overcome the limitations of the prior mapping unit, the combinatorial computing apparatus is configured to receive settings relating to multiple groups of input data and the combinatorial mode thereof, and to perform combinatorial computing operation on the set data combination.

Therefore, the combinatorial computing apparatus can support the input of multiple data sources, and thus can easily compute on multiple groups of data.

Figure 1:
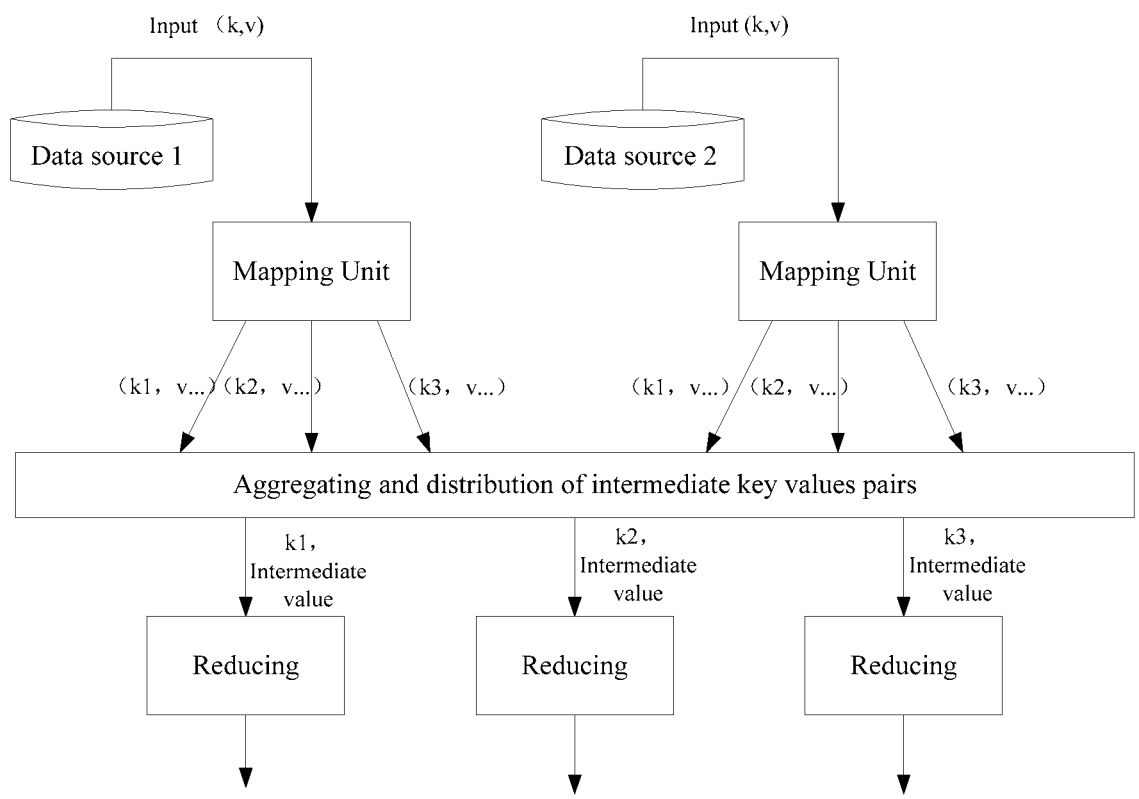
FIG. 1 illustrates the basic structure of the MapReduce model (prior art).
Figure 2:
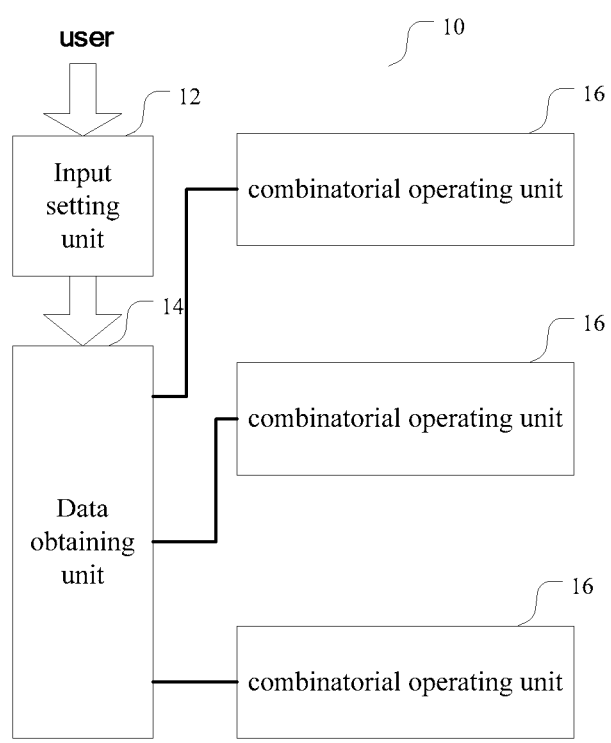
FIG. 2 illustrates a combinatorial computing apparatus according to an embodiment of the invention.

FIG. 2 schematically shows a combinatorial computing apparatus according to an embodiment of the invention. As shown in FIG. 2, the combinatorial computing apparatus 10 in a parallel computing system includes an input-setting unit 12, a data-obtaining unit 14 and at least one (the example shown in FIG. 2 has three) combinatorial operating unit 16.

The input-setting unit 12 is configured to receive a first setting relating to multiple groups of input data and a second setting relating to the combinatorial mode among the multiple groups of input data; the data-obtaining unit 14 is configured to obtain the data combination consisting of the multiple groups of input data according to the first setting and the second setting; and at least one combinatorial operating unit 16 is configured to perform the desired calculating operation on the input data combination.

In particular, in one embodiment, the input-setting unit 12 can serve as an interface for receiving from users all kinds of settings about the input, including the setting relating to the input data and the setting relating to the combinatorial mode among data.

In one embodiment, the setting relating to the input data includes the information on the data source of various groups of data, such as the name and path of the source file for the data source, the access path of the database storing the input data, and the like.

By such information, users can instruct the combinatorial computing apparatus 10 where to obtain the multiple groups of input data respectively.

In one embodiment, the setting relating to the input data further includes the setting on the format of the input data. In one example, the combinatorial computing apparatus 10 is configured to receive and process the input data in the format of key value pair (K, V). In this case, the setting on the data format can include the setting on the key and the value. By these settings, users can instruct the combinatorial computing apparatus 10 to read multiple groups of input data in particular manner and format, for example, the first key value pair (Ka, Va) and the second key value pair (Kb, Vb).

As the combinatorial computing apparatus 10 can obtain multiple groups of input data and perform operations on the particular combination of the input data, therefore, the input-setting unit 12 also receives the setting relating to the combinatorial mode of the input data. In the setting, users can define a function representing rules for combination and, by the rules for combination, the multiple groups of input data are combined, thus forming the data combination.

Now the settings on the input will be illustrated in conjunction with the examples of the array antenna and the recommending system given in the background section.

In the example of performing matrix operation for configuring array antenna, suppose to multiply m*s Matrix A by s*n Matrix B. According to the definition of matrix multiplication, we need to compute the combination of each row in Matrix A and each column in Matrix B, and take the computing result as an element in the resulting Matrix C. To this end, it is desired to obtain the elements of each row in Matrix A as the first input data, and the elements of each column in Matrix B as the second input data. In this case, we can specify in the setting relating to the input data the information of source files storing Matrix A and Matrix B, respectively, for example, the storage locations and paths in the HDFS, thereby taking Matrix A as the first data source and Matrix B as the second data source.

Furthermore, in the setting relating to the input data, we can also specify the format in which the input data are read from the first data source and the second data source. In particular, for the first data source consisting of Matrix A, we can take the row number of the Row i in the matrix as the key, and the matrix elements in the row as the value, thus forming the first input data in the format of key value pair $(Ka_i, Va_i)=(i, (a_{i1}, a_{i2}, \ldots, a_{is}))$. This is also the default data-reading mode in the parallel computing system which takes key value pairs as input data. For the second data source consisting of Matrix B, we can take the column number j in the matrix as the key, and the matrix elements in the column as the value, thus forming the second input data $(Kb_j, Vb_j)=(j, (b_{1j}, b_{2j}, \ldots, b_{sj}))$.

Thus, we can obtain the first input data sequence and the second input data sequence. As it is necessary to perform operations on the combination of the first input data and the second input data, we need to define the rules of combination among the input data. In matrix multiplication, it is required to calculate the operating result for each row in Matrix A with each column in Matrix B, and therefore we can specify in the rules for combination that each of the first input data $(Ka_i, Va_i)$ and each of the second input data $(Kb_j, Vb_j)$ are combined, thus forming multiple groups of the input data combination.

In the example of the recommending system, suppose to calculate the similarities among commodities according to the formula (1). Based on the definitions in the formula (1), the similarity between Commodity i and Commodity j relates to the ratings on the two commodities made by various users, and therefore we can directly take the rating information on the two commodities of interest, respectively, as the input data. In particular, it can be specified in the setting relating to the input data that the ratings on Commodity i by various users are taken as the first input data, and the ratings on Commodity j by various users are taken as the second input data.

Furthermore, in the setting relating to the input data, the format of the input data can also be specified. In particular, indexed by commodities, the first input data and the second input data can be set, respectively, in the format of the following key value pairs (Commodity i, (User 1, $R_{1-i}$) (User 2, $R_{2-i}$) (User 3, $R_{3-i}$) . . . ), and (Commodity j, (User 1, $R_{1-j}$) (User 2, $R_{2-j}$) (User 3, $R_{3-j}$) . . . ).

By changing the values of i and j, we can obtain the sequence of the first input data and the sequence of the second input data. Since Commodity i and Commodity j in formula (1) are symmetric, that is, S(Commodity i, Commodity j)=S (Commodity j, Commodity i), for the purpose of avoiding repeated calculations, it can be specified in the rules for combination of the input data that, if the commodity index j in the second input data is larger than the commodity index i in the first input data, the first input data and the second input data are combined to form a data combination to be further operated. For example, when i=1, the formed data combinations include (Commodity 1, Commodity 2), (Commodity 1, Commodity 3) . . . (Commodity 1, Commodity n); when i=2, for the requirement of j>i, the formed data combinations include (Commodity 2, Commodity 3), (Commodity 2, Commodity 4) . . . (Commodity 2, Commodity n), thus excluding the combination (Commodity 2, Commodity 1), which does not need to be computed once again.

Thus, the capability of flexibly setting the rules for combination can greatly reduce the overhead on computation and transmission of the intermediate results in the combinatorial computing apparatus 10, and thus improve the computing capacity.

Although the examples of the matrix operation and the recommending system are used to illustrate the setting relating to the input data that the input-setting unit 12 can receive, it can be understood that the setting interface provided by the input-setting unit 12 also applies to other applications. In the case of other applications, a person skilled in the art can do the setting on the input data according to the features of the application, and apply the setting to the combinatorial computing apparatus 10 via the input-setting unit 12.

In addition, although in the examples described above, the setting on the input data includes the setting on two groups of parallel input data, i.e. the first input data and the second input data, however, in other examples, the input-setting unit 12 can receive the setting on more input data, such that the combinatorial computing apparatus 10 can support more groups of parallel input data.

It can be understood that, besides the particular settings exemplified above, the input-setting unit 12 can also receive further settings relating to the input. For example, in one example, the further settings can include the settings on reading order and reading range of the input data. In addition, if necessary, the input-setting unit 12 can be further configured to, based on the setting received, put further limitations on each of the combinatorial operating units 16. In one example, the input-setting unit 12 receives the setting relating to the input data, which instructs the combinatorial computing apparatus 10 to read the input data from a relatively large data source, and combine the input data.

On the other hand, as shown in FIG. 2, the combinatorial computing apparatus 10 includes three combinatorial operating units 16, which probably have different processing capacity. Therefore, besides transmitting the received setting on the input to the data-obtaining unit 14, the input-setting unit 12 also refines the setting. In particular, the input-setting unit 12 divides the target data source determined by the above setting into many parts depending on the processing capacity of each combinatorial operating unit 16, and instructs the data-obtaining unit 14 to read data from the specified part of the data source, thereby splitting the task and distributing it to the combinatorial operating units 16.

When splitting the task as described above, the input-setting unit 12 can divide the data source by referring to the setting relating to the combinatorial mode of the input data, such that the operating units 16 produce a minimum of intermediate key value pairs, and the I/O transmission among the operating units 16 is reduced to the lowest possible level.

On the basis that the input-setting unit 12 obtains the various settings relating to the input, the data-obtaining unit 14 reads the input data from data sources according to these settings, thus forming the desired data combination.

Figure 3:
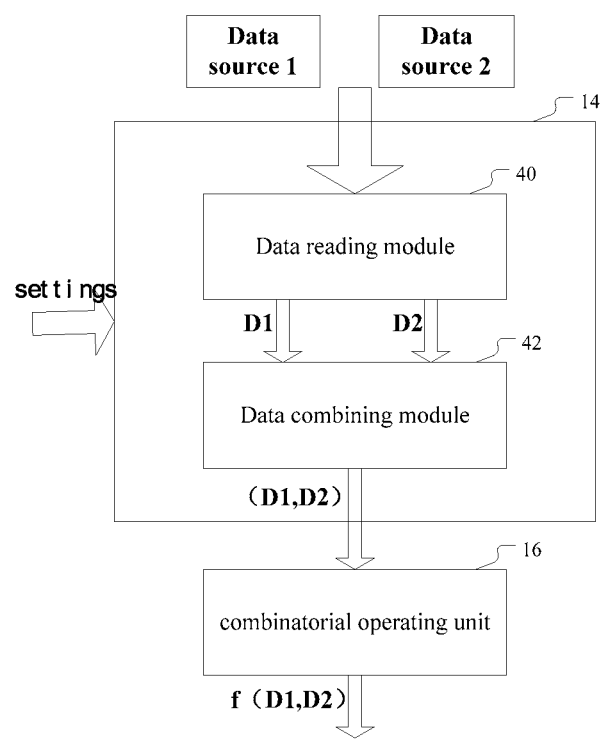
FIG. 3 illustrates a structure diagram showing a data-obtaining unit 14 according to an embodiment of the invention.

FIG. 3 is a structure diagram showing a data-obtaining unit 14 according to an embodiment of the invention. As shown in FIG. 3, the data-obtaining unit 14 includes a data-reading module 40, configured to read multiple groups of input data according to the setting relating to the input data; and a data-combining module 42, configured to combine the read multiple groups of input data according to the setting relating to the combinatorial mode of the input data, thus forming data combinations.

In particular, data-reading module 40 obtains from the input-setting unit 12 the setting relating to the input data, including the data source information, the data format information, etc, and reads data from the specified data source in the specified format according to the setting, thus forming multiple groups of parallel input data (for example, D1 and D2). In one embodiment, data-reading module 40 produces the input data in the format of key value pairs according to the above setting.

Based on that, data-combining module 42 obtains from the input-setting unit 12 the setting relating to the combinatorial mode of the input data, that is, obtains the rules for combination of the input data. Based on the rules, the data-combining module 42 combines the multiple parallel input data obtained by the data-reading module 40, thus forming the desired data combinations (for example, (D1, D2)).

On the basis of obtaining the data combinations, the at least one combinatorial operating unit 16 can perform the desired computing operations on the formed data combinations. Generally, the combinatorial operating unit 16 performs the computing operations on the obtained data combinations according to a function defined by users (for example, f(D1, D2)). Such a combinatorial operating unit 16 functions in a similar way to that of the mapping unit in the prior art, which is to perform mapping or computing operations on the input data flow based on a function defined by users. The difference is that, the prior mapping unit can only map single data set, while the combinatorial operating unit 16 performs operations on data combinations consisting of multiple groups of data, which operations can involve calculations among different groups of data in data combinations.

It can be understood that, in order to obtain the above mentioned function defined by users, the combinatorial operating unit 16 can provide an interface for receiving the definition on the operating function from users. In one embodiment, this interface can alternatively be provided by the input-setting unit 12.

It can be understood that, the above description to the data-obtaining unit 14 and the at least one combinatorial operating unit 16 in conjunction with the drawings is merely exemplary explanation to their functions, without any intention to limit their forms. In practice, these units can be arranged in different structures and forms. In one embodiment, the combinatorial operating unit 16 can be integrated with the data-obtaining unit 14, such that each of the combinatorial operating units 16 has its own specific data-reading function. In another embodiment, the combinatorial operating unit 16 is separated from the data-obtaining unit 14, and all the combinatorial operating units 16 can share the same data-obtaining unit 14, and receive from it the assigned data combinations.

In one embodiment, in order that the combinatorial computing apparatus 10 takes full advantage of the existing MapReduce platform as much as possible, the mapping unit in the MapReduce system is modified to make the combinatorial operating unit 16 as described above. In order to meet the requirement of the mapping unit on the format of the input data, the data-obtaining unit 14 is also configured to convert the obtained data combinations into the format of single key value pair according to a certain rule. Based on the prior mapping unit, the combinatorial operating unit 16 is further configured to split the obtained key value pairs into data groups according to the above rule, that is, to restore them to the data combinations including multiple groups of data, and perform computing operations on the data combinations based on the user-defined function.

In one particular example, the data-reading module 40 reads the first input data (Ka, Va) and the second input data (Kb, Vb), respectively, and the data-combining module 42 combines them together, forming the data combinations {(Ka, Va), (Kb, Vb)}. In order to meet the input format of single key value pair, the data-combining module 42 rearranges the formed data combinations into the format of (KaKb, VaVb), wherein the key in the new key value pair is from the combination of the first key Ka and the second key Kb, and a special tag is added there between serving as a list separator. After receiving such rearranged key value pair, the combinatorial operating unit 16 splits the obtained single key value pair into two key value pairs by recognizing the above mentioned special tag, and performs operations on the two key value pairs according to the defined function.

However, it can be understood that, in other embodiments, the combinatorial operating unit 16 can be independent from any of the prior computing systems. Therefore, the data-obtaining unit 14 can directly transmit the multiple groups of input data in the format of data combinations to the combinatorial operating unit 16 to perform the computing operations.

Next, the examples of the matrix operation and the recommending system are still used to explain the implementing mode of the data-obtaining unit 14 and the combinatorial operating unit 16.

In the example of performing matrix operation for configuring array antenna, as described above, the input-setting unit 12 can obtain various settings relating to the input. In particular, in these settings, it is defined that the apparatus can read from Matrix A the first input data in the format of (i, ($a_{i1}$, $a_{i2}$, . . . , $a_{is}$)), and from Matrix B the second input data in the format of (j, ($b_{1j}$, $b_{2j}$, ..., $b_{sj}$)), and combine any of the first input data and the second data. Based on such settings, by scanning Rows 1~m of Matrix A, the data-reading module 40 in the data-obtaining unit 14 can obtain a sequence of the first input data (i, ($a_{i1}$, $a_{i2}$, ..., $a_{is}$)), i=1~m, wherein each of the input data represents the element data in a row of Matrix A.

Similarly, by scanning Columns 1~n of Matrix B, it can obtain a sequence of the second input data (j, ($b_{1j}$, $b_{2j}$, ..., $b_{sj}$)), j=1~n, wherein each of the input data stands for the element data in a column of Matrix B.

Thus, the data-reading module 40 reads from the first data source and the second data source the sequence of the first input data and the sequence of the second input data, respectively, in the format of key value pairs. Subsequently, the data-combining module 42 combines the data in the obtained input data sequences based on the defined rules for combination. As described above, in matrix multiplication, it is needed to multiply each row of Matrix A by each column of Matrix B.

Therefore, according to the rule for combination, the data-combining module 42 combines each of the first input data ($Ka_i$, $Va_i$) with each of the second data ($Kb_j$, $Vb_j$), thus forming the input data combinations {($Ka_i$, $Va_i$), ($Kb_j$, $Vb_j$)}, wherein i=1~m, j=1~n. On the obtained data combinations, the combinatorial operating unit 16 performs operations according to the user-defined function. For matrix multiplication, the user-defined function is multiplication and then addition of matrix elements. Therefore, the combinatorial operating unit 16 accordingly performs the functional operation as below on every data combination:

$$f\{(Ka_i, Va_i), (Kb_j, Vb_j)\}=f\{(i, (a_{i1}, a_{i2}, \ldots, a_{is})), (j, (b_{1j}, b_{2j}, \ldots, b_{sj}))\}=(Cij, a_{i1}b_{1j}+a_{i2}b_{2j}+\ldots+a_{is}b_{sj})$$

By the above operations, the combinatorial operating unit 16 can perform direct operation on the two groups of input data in the data combinations, thus obtaining the element Cij of the resulting matrix.

In the example of the recommending system, according to the settings as described above, the data-reading module 40 takes the ratings on Commodity i by various users as the first input data, i.e. ($Ka_i$, $Va_i$)=(Commodity i, (User 1, $R_{1-i}$) (User 2, $R_{2-i}$) (User 3, $R_{3-i}$) ... ), and the ratings on Commodity j by various users as the second input data, i.e. ($Kb_j$, $Vb_j$)=(Commodity j, (User 1, $R_{1-j}$) (User 2, $R_{2-j}$) (User 3, $R_{3-j}$) ... ), and obtains the first input data sequence and the second input data sequence by varying the values of i and j. Furthermore, according to the rule for combination of the input data, the data-combining module 42 combines the first input data ($Ka_i$, $Va_i$) with the second input data ($Kb_j$, $Vb_j$), thus forming the input data combinations {($Ka_i$,$Va_i$), ($Kb_j$, $Vb_j$)}, wherein i<j. On each data combination thus obtained, the combinatorial operating unit 16 performs operations according to the user-defined function. For the calculation of similarities in the recommending system, the user-defined function is the formula for calculating similarities as shown by Formula (1). Therefore, the combinatorial operating unit 16 directly puts the data combinations into Formula (1), and obtains the similarity between Commodity i and Commodity j.

Although hereinbefore the examples of the matrix operation and the recommending system are used to illustrate the implementing mode of the data-obtaining unit 14 and the combinatorial operating unit 16, however, it can be understood that the above units can be applied to still more different applications.

In addition, although in the above examples, the combinatorial operating unit 16 is configured to perform operations on the data combinations consisting of two groups of input data, however, in other examples, the input-setting unit 12 can receive the setting on more groups of input data, and accordingly, the data-obtaining unit 14 can read more groups of parallel input data according to the setting, such that the combinatorial operating unit 16 can perform operations and calculations on more complex data combinations. For instance, in one example, the data-obtaining unit 14 can read four groups of input data in parallel according to the setting relating to the input data received by the input-setting unit 12, and select three groups out of the four groups of input data, thus forming the data combinations according to the setting relating to the rule for combination. Then the combinatorial operating unit 16 can perform functional operations on thus obtained data combinations.

In addition, it should be appreciated that as for the input-setting unit 12, the data-obtaining unit 14 and the combinatorial operating unit 16, their partition and respective structures are only for the purpose of representing their functions, without any intention to put limitations on the actual structures and physical platforms. The above units can be implemented in the same or different physical machines or virtual machines, so as to execute the desired processing in parallel.

Figure 4:
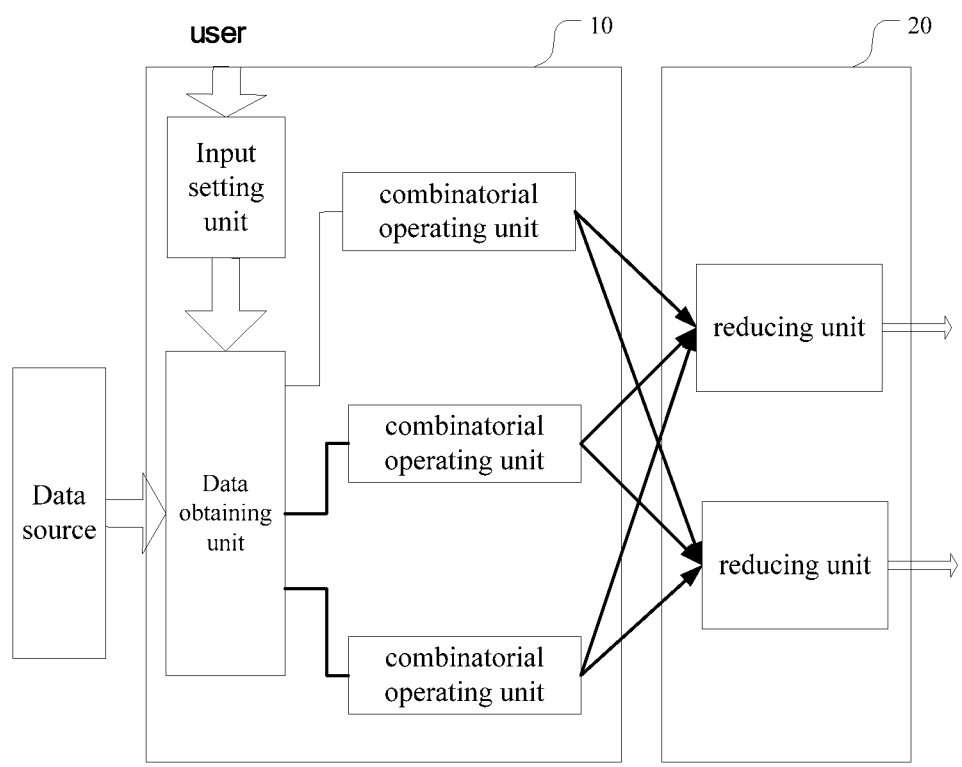
FIG. 4 illustrates a parallel computing system according to an embodiment of the invention.

Based on the combinatorial computing apparatus 10 as described above, an embodiment of the invention further provides a parallel computing system. FIG. 4 schematically shows a parallel computing system according to an embodiment of the invention. As shown in the figure, the parallel computing system includes the combinatorial computing apparatus 10 and a reduce computing apparatus 20, wherein the combinatorial computing apparatus 10 performs combinatorial computing and processing on multiple groups of parallel input data as described above, and produces intermediate data; and the reduce computing apparatus reduces and merges the intermediate data to produce a final result.

Reduce computing apparatus 20 can include a plurality of reducing units, similar to the reducing units in the prior MapReduce system. By using the combinatorial computing apparatus 10 and reduce computing apparatus 20, a huge task can be distributed to many parallel computing units for combinatorial computing, and then be emerged to produce the desired result. At the same time, as the combinatorial computing apparatus 10 can support the combinatorial operation and process of multiple groups of data, the task processing in the parallel computing system becomes much easier.

In the case of multiple data inputs, as long as users set the data source to be processed and define an operational function, the parallel computing system can automatically obtain data combinations and perform operations on the data combinations, unlike the prior parallel computing system, which needs to convert the data source into a particular format by complex programming.

Figure 5:
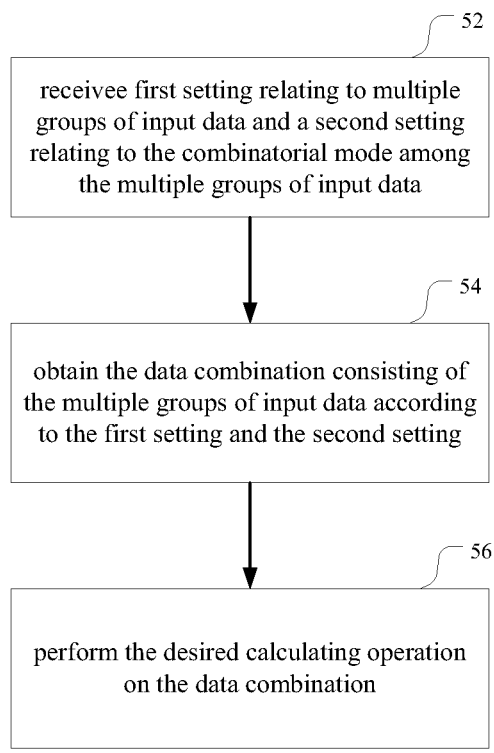
FIG. 5 illustrates a flow chart showing a method according to an embodiment of the invention.

Based on the same inventive concept, the invention also provides the corresponding method for combinatorial computing. FIG. 5 is a flow chart showing a method according to an embodiment of the invention. As shown in FIG. 5, the combinatorial computing method according to an embodiment of the invention includes: step 52, receiving a first setting relating to multiple groups of input data and a second setting relating to the combinatorial mode among the multiple groups of input data; step 54, obtaining the data combination consisting of the multiple groups of input data according to the first setting and the second setting; and step 56, performing the defined calculating operation on the data combination.

In particular, in one embodiment, the first setting described above includes the information on the data source of the data, such as the name and path of the source file for the data source, the access path of the database storing the input data, and the like. In one embodiment, the first setting described above further includes the setting on the format of input data, for example, the setting on the key and value in a key value pair. In one embodiment, the second setting includes the rule for combination of multiple input data.

After obtaining the above settings, in step 54, the data combinations to be processed are obtained based on the settings. In particular, step 54 can be divided into the following two substeps. First, according to the data source information, data format information, etc. in the first setting, it reads data from the specified data source in the specified format, thus forming multiple groups of parallel input data.

Second, according to the rule for combination in the second setting, it combines the read multiple groups of parallel input data, thus forming data combinations. On the formed data combinations, in step 56, it can perform computing operations according to the defined function.

As the principle and mode of implementation for the above combinatorial computing method correspond to the description on the apparatus shown in FIG. 3 and FIG. 4 hereinbefore, the detailed description is omitted for concision.

The combinatorial computing apparatus and method according to the embodiments of the invention can directly operate on and process the multiple data inputs, thus improving the operability and applicability of the parallel computing system.

Figure 6:
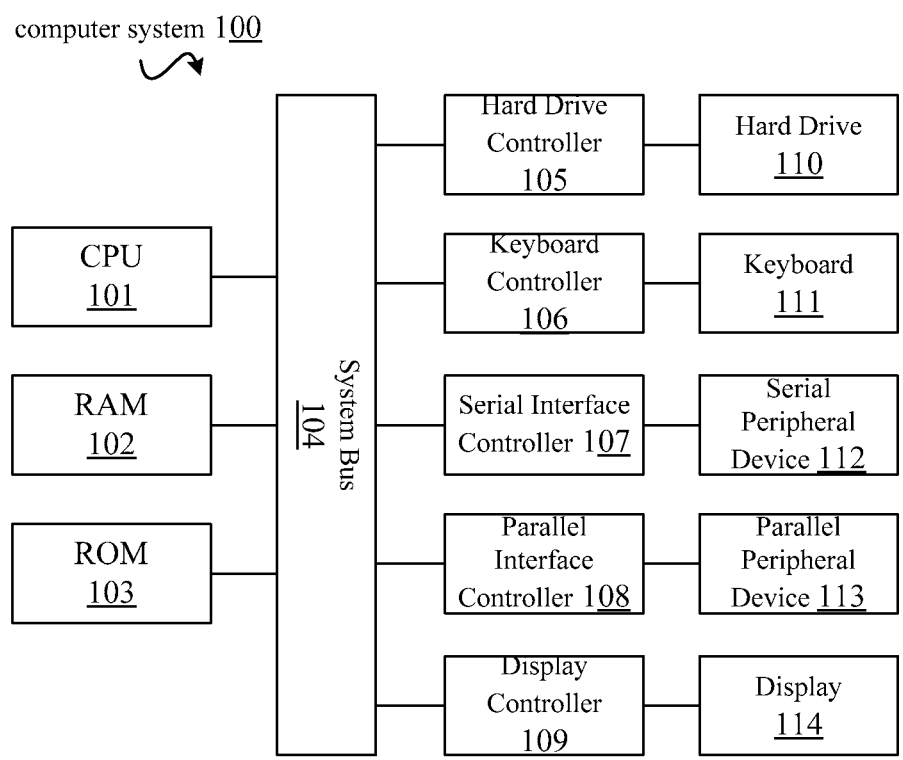
FIG. 6 illustrates a block diagram showing an exemplary computing system 100 suitable to implement the embodiments of the invention.

It can be understood that the apparatus and method for the invention can be implemented in various manners. FIG. 6 shows an example of computer system 100 which is applicable to implement the embodiments of the present invention. As shown in FIG. 6, the computer system 100 can include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109.

It should be understood that the structure as shown in FIG. 6 is only for the purpose of showing an example, not for any limitation to the present invention. In some cases, some devices can be added to or removed from the computer system 100 based on specific situations.

Those skilled in the art can understand that the above-mentioned method and apparatus for combinatorial computing can be practiced by executable instructions and/or controlling codes in the processors e.g. codes in mediums like disc, CD or DVD-ROM; memories like ROM or EPROM; and carriers like optical or electronic signal carrier. The apparatus and its units can be realized using hardware like VLSI or Gates and Arrays, like semiconductors e.g. Logic Chip, transistors, etc., or like programmable hardware equipments e.g. FPGA, programmable logic equipments, etc.; or using software executed by different kinds of processors; or using the integration of said hardware and software. The application for implementing the invention can be programmed using object-oriented languages like Java, Smalltalk, C++, etc., and the traditional procedural languages like C language or other similar languages. The source code can be executed locally or remotely.

The above-described exemplary embodiments are intended to be illustrative in all respects of the method and apparatus for combinatorial computing, rather than restrictive, of the present invention. Those skilled in the art should recognize that the present invention is capable of many variations and modifications within the scope and spirit of the present invention. The scope of the present invention is defined only by the appended claims.

What is claimed is:

1. A parallel computing system, comprising:
at least one processor;
a memory coupled to the at least one processor;
a combinatorial computing mechanism executed by the at least one processor, the combinatorial computing mechanism including:
an input-setting unit to receive a first setting relating to a format and a data source for reading multiple groups of input data and a second setting relating to a combinatorial mode for combining the multiple groups of input data;
a data-obtaining unit to obtain a data combination of the multiple groups of input data according to the first setting and the second setting;
an arranging unit to arrange, in response to obtaining the data combination of the multiple groups of input data according to the first setting and the second setting, a first group and a second group of the multiple groups of input data into a format of a single data set according to a certain rule,
wherein the certain rule determines a first input data element from the first group and a second input data element from the second group, and
determines a first key value for the first input data element and a second key value for the second input data element, and
merges the first input data element to the second input data element into the format of the single data set, wherein the first input data element and the second input data element are separated by a special format tag having key value data;
at least one combinatorial operating unit to perform a desired calculating operation on the data combination; and
a converting unit to convert, in response to performing the desired calculating operation on the data combination, the single data set to the data combination of the multiple groups of input data by assigning, based on the key value data of the special format tag, the first key value to the first input data element and the second value to the second input data element.

2. The system according to claim 1, wherein the setting on the format of the input data includes setting the input data in a format of key value pairs for indicating a particular group of the multiple groups of input data.

3. The system according to claim 1, wherein the input-setting unit refines information on the data source in the first setting that is specific to the at least one combinatorial operating unit.

4. The system according to claim 1, wherein the at least one combinatorial operating unit comprises an interface for receiving an operational function and performs calculating operation on the data combination according to the received operational function.

5. The system according to claim 1, wherein the combinatorial computing mechanism produces intermediate data and further comprises a reduce computing. mechanism that includes a plurality of reducing units, wherein each reducing unit reduces and merges the intermediate data to produce a final result.

6. The system of claim 1, wherein the certain rule further comprises: selecting the first input data element from the first group of input data and the second input data element from the second group of input data and combining the first input data element and the second input data element in a combinatorial sequence.

7. The system of claim 6, further comprising:
a performing module to perform, on the combinatorial sequence, a matrix operation; and
an ordering module to order, based on a matrix row value, the first input data element and the second input data element.

8. The system of claim 6, wherein the certain rule includes:
a first determining module to determine both a first commodity index value for the first input data element and a second commodity index value for the second input data element;
a comparing module to compare the first commodity index value for the first input data element with the second commodity index value for the second input data element;
a second determining module to determine, in response to comparing the first commodity index value for the first input data element with the second commodity index value for the second input data element, that the second commodity index value is greater than the first commodity index value; and
a combining module to combine, in response to determining that the second commodity index value is greater than the first commodity index value, the first input data element and the second input data element in the combinatorial sequence.

9. The system of claim 8, wherein the certain rule reduces redundant calculations, and the first commodity index value and the second commodity index value are based on user ratings.

10. The system of claim 6, wherein combining the first input data element and the second input data element in the combinatorial sequence further include using:
a computing module to compute a key value pair based on both the first key value for the first input data element and the second key value for the second input data element; and
a first assigning module to assign the key value pair to the format of the single data set.

11. The system of claim 10, wherein the converting unit converts the single data set back to a data combination of the multiple groups of input data according to the certain rule includes:
prior to assigning by the converting unit, based on the key value data of the special format tag, the first key value to the first input data element and the second key value to the second input data element:
an identifying module to identify, in response to receiving the combinatorial sequence by a combinatorial operating unit, the special format tag; and
a splitting module to split, based on the special format tag, the combinatorial sequence into the first input data element and the second input data element.

* * * * *